United States Patent [19]

Kudo

[11] Patent Number: 4,955,662
[45] Date of Patent: Sep. 11, 1990

[54] VEHICLE BODY STRUCTURE REINFORCED BY COWL MEMBER

[75] Inventor: Michio Kudo, Yamato, Japan

[73] Assignee: Nissan Motor Co., Ltd., Japan

[21] Appl. No.: 244,396

[22] Filed: Sep. 15, 1988

[30] Foreign Application Priority Data

Sep. 18, 1987 [JP] Japan ............................ 62-142694[U]

[51] Int. Cl.⁵ ............................................. B62D 25/08
[52] U.S. Cl. ..................................... 296/192; 296/194
[58] Field of Search ................ 296/192, 187, 194, 203

[56] References Cited

U.S. PATENT DOCUMENTS

| | | | |
|---|---|---|---|
| 3,086,606 | 4/1963 | Schwiering et al. | 296/194 X |
| 3,188,132 | 6/1965 | Schwiering et al. | 296/194 |
| 3,596,978 | 8/1971 | Wessells et al. | 296/194 |
| 4,440,435 | 4/1984 | Norlin | 296/194 X |
| 4,542,934 | 9/1985 | Komatsu et al. | 296/194 |
| 4,717,198 | 1/1988 | Komatsu | 296/192 |
| 4,840,423 | 6/1989 | Maekawa | 296/194 |

FOREIGN PATENT DOCUMENTS

| | | | |
|---|---|---|---|
| 2494204 | 5/1982 | France | 296/194 |
| 58-6666 | 1/1983 | Japan | 62/25 |

*Primary Examiner*—Margaret A. Focarino
*Assistant Examiner*—Andrew C. Pike
*Attorney, Agent, or Firm*—Leydig, Voit & Mayer

[57] ABSTRACT

A vehicle body structure comprises a cowl member, serving as a transversely extending vehicle structural member, having lateral end portions thereof secured to right and left strut towers at top ends of the strut towers to bridge the strut towers.

1 Claim, 1 Drawing Sheet

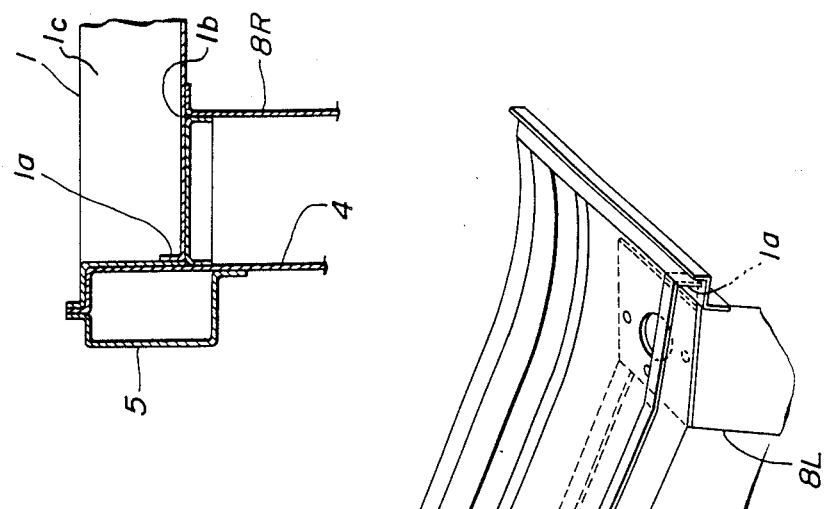
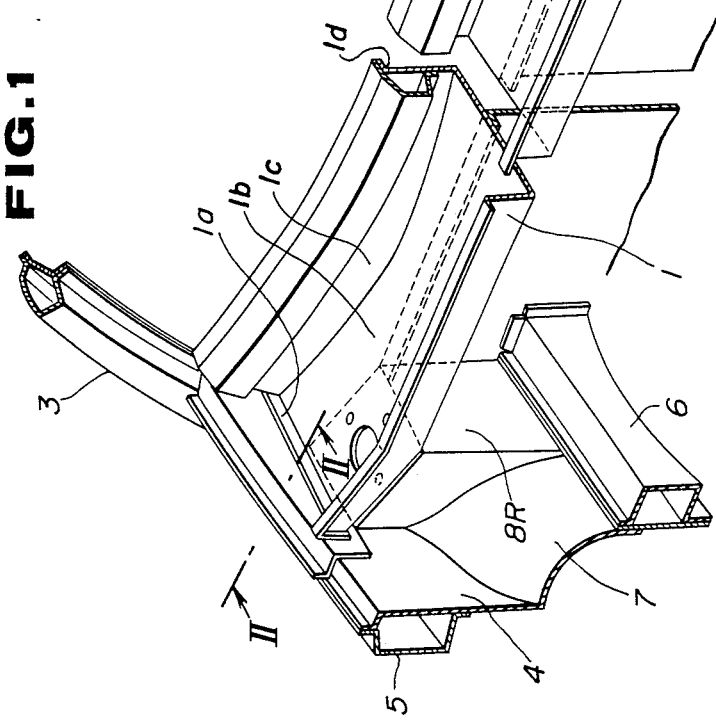

VEHICLE BODY STRUCTURE REINFORCED BY COWL MEMBER

BACKGROUND OF THE INVENTION

The present invention relates to a vehicle body structure and more particularly to a vehicle body front structure including a cowl member.

JP-UM No. 58-6666 discloses a vehicle body front structure which includes a cowl member transversely extending between right and left front pillars and secured thereto in order to provide increased vehicle body rigidity. The engine compartment is defined by two longitudinally extending parallel hood side panels having front side members that act as vehicle longitudinal structural members which are secured to provide an increased bending rigidity of vehicle body. The hood side panels are curved inwardly to define tire housings. Box-shaped strut towers are joined therewith. Connected to top ends of the strut towers are struts of front suspension units, respectively.

According to this known vehicle body structure, the strut towers tend to incline inward toward the center line of the engine compartment owing to load input from the front suspension units, thus requiring a transversely extending beam to minimize this tendency. Besides, the strut towers tend to incline inward and move rearward to interfere with some of the other component parts within the engine compartment, resulting in substantial deformation of an instrument or dash panel of the vehicle.

An object of the present invention, therefore, is to provide a vehicle body front structure which effectively prevents inward inclination of strut towers for increased vehicle body structural strength.

SUMMARY OF THE INVENTION

According to the present invention, a vehicle body structure comprises a cowl member, serving as a transversely extending vehicle structural member, having lateral end portions secured to right and left strut towers at top ends of the strut towers to bridge the strut towers.

The cowl member is of an upward open channel construction and is also secured to right and left front pillars and upper portions of hood side panels to which panel reinforcing members are secured for reinforcement.

BRIEF DESCRIPTION OF THE DRAWINGS

FIG. 1 is a perspective fragmentary view of a vehicle body structure according to the present invention;

FIG. 2 is a section through the line II—II of FIG. 1;

DETAILED DESCRIPTION OF THE INVENTION

Referring to FIG. 1, there is shown a perspective fragmentary view of a front portion of a vehicle body structure. The vehicle body structure comprises a cowl member 1 serving as a vehicle body structural member for increased transverse rigidity of vehicle body. This cowl member 1 is a channel member open upward and having a bottom wall $1b$, a rear wall $1c$, and a rear flange $1d$, and thus may be called as an open cowl member. This cowl member 1 extends between right and left strut towers 8R and 8L, and has lateral end portions thereof secured to the right and left strut towers 8R and 8L on their upper ends. With this cowl member 1, inward inclination of each of the strut towers 8R and 8L is prevented, thus providing increased vehicle body structural rigidity. Referring also to FIG. 2, the cowl member 1 has an attachment flange $1a$ attached to lateral ends of the bottom wall $1b$. The attachment flange $1a$ extends in opposed relationship with the inside of a right front pillar 3 and the inside of the hood side panel 4, only one being shown and designated by the reference numeral 4. The flanges $1a$ are secured to the hood side panels, including the hood side panel 4 shown in FIG. 1. The hood side panels 4 define side walls of the engine compartment. A left front pillar similar in structure and mounting to the right front pillar 3 is not shown. Secured to the upper portion of the outside of each of the hood side panels 4 is a panel reinforcing member 5 for the hood side panel 4. This reinforcing member 5 joins with the front pillar 3. Secured to the lower portion of the inside of the hood side panel 4 is a front side member 6 which serves as a vehicle structural member for providing longitudinal structural rigidity of the vehicle body. Each of the hood side panels 4 defines an inwardly projected front wheel housing 7. The above-mentioned strut tower 8R joins with the front wheel housing 7. At the top end of the strut towers 8R, 8L a strut of a front suspension unit, not shown, is connected in the conventional manner. Since, according to this embodiment, the cowl member 1 is an open cowl member, the work of connecting the cowl member 1 to the tops of the strut towers 8R and 8L can be automatically carried out by robots.

With the vehicle front structure constructed as above, the strut towers 8R and 8L receive and support vehicle weight and input from the road surface via the front suspension units. The load imposed on the strut towers 8R and 8L is borne not only by the cowl member 1, but also by the right and left front pillar's as stated above, only the right front pillar is shown and designated by the reference numeral 3. The load is also borne by the upper portions of the hood side panels 4 where they are reinforced by the panel reinforcing members 5, since the cowl member 1 is secured to the front pillars 3 and also to the upper portions of the hood side panels 4. In this manner the load is distributed to vertical structural members, namely, the front pillars 3, and also to longitudinal structural members, namely the upper portions of the hood side panels 4 where the panel reinforcing members 5 are secured. This has avoided local concentration of load on particular panels or structural members, thus providing an increased structural rigidity of vehicle body front structure.

During front end collision of the vehicle, since the vehicle front portion crashes, the right and left hood side panels tend to deform toward the center line of the engine compartment and the strut towers 8R and 8L tend to incline toward the center line of the engine compartment and move rearward. However, since the cowl member 1 bridges the right and left strut towers 8R and 8L and acts as a reinforcing member, the inward inclination of the strut towers 8R and 8L and the rearward movement thereof are effectively restrained, thus securing a survival zone within a passenger compartment of the vehicle by preventing the projection of the strut towers 8R and 8L into the passenger compartment.

What is claimed is:

1. A body structure for a vehicle comprising:

strut towers constructed and arranged to bear load from suspension units of the vehicle, said strut towers having upper ends, respectively, and a cowl member, in the form of a channel member having a bottom wall, said bottom wall extending between said strut towers and having end portions thereof secured directly to said strut towers on said upper ends thereof, respectively, thereby resisting inclination of said strut towers towards each other.

* * * * *